United States Patent

[11] 3,603,794

[72] Inventor Fred Mast
Zuzwil/SG, Switzerland
[21] Appl. No. 53,952
[22] Filed July 10, 1970
[45] Patented Sept. 7, 1971
[73] Assignee Ciba Limited
Basel, Switzerland
[32] Priority July 18, 1969
[33] Switzerland
[31] 11074/69

[54] APPARATUS FOR TRANSDUCING INFRARED IMAGES INTO VISIBLE IMAGES UTILIZING A LIQUID LIGHT CONTROL LAYER
7 Claims, 2 Drawing Figs.

[52] U.S. Cl. .................................................. 250/83.3 HP,
250/213 R, 350/161, 350/162 SF
[51] Int. Cl. .................................................. G01t 13/00
[50] Field of Search ........................................ 250/83.3
HP, 83.3 H, 213 R; 350/161, 162 SF; 178/5.4 BD

[56] References Cited
UNITED STATES PATENTS
3,397,313 8/1968 Must ............................. 250/83.3 H

*Primary Examiner*—James W. Lawrence
*Assistant Examiner*—Morton J. Frome
*Attorney*—Pierce, Scheffler & Parker ABSTRACT: Apparatus for making incoming infrared rays visible includes an infrared optical system which serves to focus the rays through an optical grating onto the surface of a deformable liquid film deposited on a plane face of a transparent prism, the prism being so disposed in the path of a Schlieren-optical system that a beam of visible light produced by a source enters the liquid film from the baCk, is totally internally reflected at its surface adjacent the grating onto a concave mirrored surface of the prism which returns the beam to the liquid where it is again totally internally reflected by the liquid surface and then imaged on the bar-and-slot system of the schlieren-optics. In the absence of incoming infrared rays, the surface of the liquid film remains undeformed and the beam of visible light is turned back into its source. Upon deformation of the liquid surface by incoming infrared rays, visible light returning from the prism passes through the slots of the bar-and-slot system to establish an observable image of the deformation.

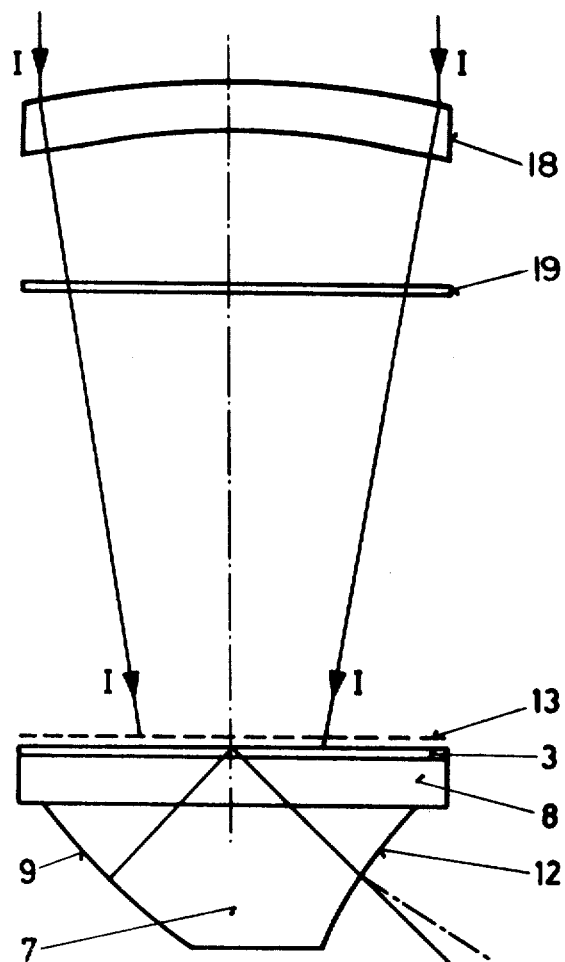
FIG.1
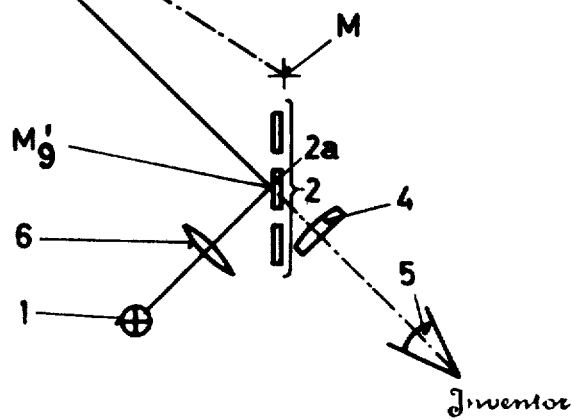

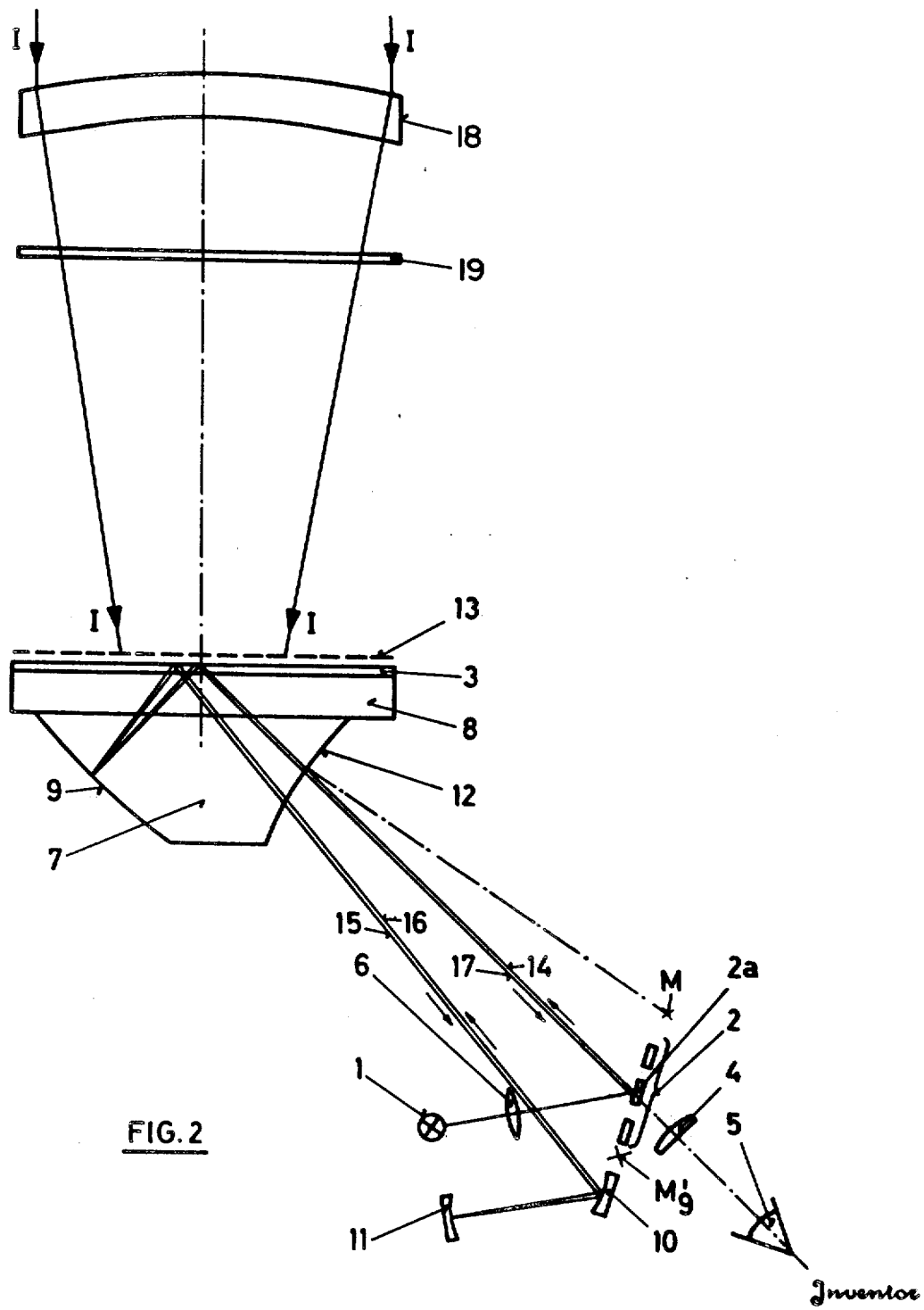

APPARATUS FOR TRANSDUCING INFRARED IMAGES INTO VISIBLE IMAGES UTILIZING A LIQUID LIGHT CONTROL LAYER

The invention relates to apparatus for making infrared rays visible, in which the infrared rays are focused by an infrared optical system through an optical grating on to a deformable liquid film deposited on one plane face of a transparent prism so disposed in the path of the light beam produced by a schlieren-optical system that the visible light enters the liquid film from the back and is totally internally reflected at its surface.

Such apparatus has already been described in detail for instance in U.S. Pat. Specification No. 3,397,313. The present invention is intended to improve this known arrangement with a view to achieving a basic increase in sensitivity.

In a preferred embodiment of the invention to be described in detail later a bar and slot system of a schlieren-optical system is imaged upon itself by a first concave mirror interposed in the path of the visible light beam projected by the schlieren-optical system after their total reflection at the surface of the liquid film, the optical system being so arranged that the maximum linear diameter of the light beam produced by the light source in the plane of the schlieren bar and slot system is smaller than the product of the spacing of the optical grating times the refractive index of the material of the prism times the radius of curvature of the first concave mirror divided by the greatest distance of the first concave mirror from the surface of the liquid film.

Compared with hitherto conventional apparatus the proposed arrangement is capable of at least doubling the sensitivity of the arrangement to infrared.

The invention will be hereinafter more particularly described with reference to two embodiments schematically illustrated in FIGS. 1 and 2.

With reference to FIGS. 1 and 2, these show an infrared optical system 18, a projecting light source 1, a schlieren bar and slot system 2, a liquid film (thickness exaggerated) 3, a projecting objective 4, a grating 13 and an eyepiece 5. A suitable liquid to serve as the film 3 is described in the aforementioned U.S. Pat. No. 3,397,313 granted Aug. 13, 1968, this being a low viscosity hydrocarbon such as, for example, decane, hexane or octane. The infrared rays which are marked I in the drawings are collimated by the infrared optical system 18 and projected through an infrared filter 19 and the grating 13 onto the liquid film 3. Surface elements of the film 3 which are not covered by the bars of the grating 13 form depressions of a depth depending upon the intensity of the local infrared radiation. The surface of the liquid film, is thus deformed to correspond to the infrared image. The light coming from the light source 1 is collimated by a lens 6 and falls on part 2a of the schlieren bar and slot system. The part 2a is mirrored and reflects the light to a prism 7 of transparent material carrying a transparent plate 8 on a plane face. The uppermost surface of this plate 8 which must be of optical quality supports the liquid film 3. The light enters the film 3 from the back, having passed through the plate 8, and is totally internally reflected at the surface of the film to the third face of the prism. This latter face forms part of the surface of a sphere and is mirrored, thus forming a concave mirror 9. The center of curvature $M'_9$ of this mirror is located in the plane of the schlieren bar and slot system 2, preferably in the mirrored part 2a.

The focusing of the projected light beam in the plane of the schlieren bar and slot system 2 must be sufficiently sharp and/or the mirrored surface 2a must be sufficiently small for the following condition to be satisfied with regard to the maximum linear dimension D of the light beam that is produced in the plane of the schlieren bar and slot system 2:

$$D < (d \cdot n \cdot R/L,$$

where $d$ is the spacing of the grating 13, which determines the spacing of the surface deformations and hence the resolution, $n$ is the refractive index of the material of the prism 7 and of the baseplate 8, R is the radius of curvature of the concave mirror 9 and L is the greatest distance between the liquid film 3 and the concave mirror 9. The maximum linear diameter D of the light beam determines the power of resolution. Owing to the known properties of the schlieren-optical system the linear dimensions of the light beam must be less in one direction that in a direction normal thereto. For a determination of the power of resolution the greater of these two linear dimensions is decisive.

In the embodiment according to FIG. 1 the light from the concave mirror 9 is reflected by the surface of the liquid film 3 back to the schlieren bar and slot system 2. When the surface of the film is not deformed the light returns at least approximately to its origin. The view in the eyepiece 5 remains dark. When the surface of the film is deformed the light passes through the slots in the bar and slot system 2 to the objective 4 which therefore causes an image of the deformations of the film surface to be observed in the eyepiece 5.

In the embodiment according to FIG. 1 the light source 1 might, as an alternative, be directly affixed to the part 2a of the bar and slot system, in which case its size would have to conform with the required size of the light beam.

In the embodiment according to FIG. 2 the light from the concave mirror 9 is reflected by an intermediate concave mirror 10 lying in the plane of the bar and slot system 2 to a further concave mirror 11, the intermediate concave mirror 10 imaging the surface of the liquid film 3 on the concave mirror 11. In this arrangement the center of curvature $M'_9$ of the concave mirror 9 lies at least approximately in the middle between the part 2a of the schlieren bar and slot system and the intermediate concave mirror 10. Consequently a point on part 2a of the schlieren bar and slot system is imaged via the liquid film 3 by the concave mirror 9 on the intermediate mirror 10.

The light which is reflected from the concave mirror 11 via the concave mirror 10 and the surface of the film back to the concave mirror 9 is thus reflected a second time by the latter concave mirror to the schlieren bar and slot system. The beam of light from the light source 1, which is reflected by the mirrored part 2a of the bars towards the concave mirror 9 is indicated by 14, the beam of light reflected by the concave mirror 9 to the intermediate concave mirror 10 is indicated by 15 and that reflected by the concave mirror 11 via the intermediate concave mirror 10 to the mirror 9 is indicated by 16, whereas the beam of light reflected by the concave mirror 9 to part 2a of the bar and slot system is indicated by 17. The distance between the two light beams 14 and 17 on the one hand and 15 and 16 on the other hand has been exaggerated for the sake of clarity. In practice this distance is extremely small and the several light beams practically coincide. Similarly all four beams of light are substantially incident on the same point of the surface of the liquid film 3. When the liquid film 3 is undeformed the light falls on part 2a of the bar and slot system which in this arrangement is mirrored. On the other hand, when the liquid film 3 is deformed the light passes through the slots in the bar and slot system 2, i.e. past the bar 2a and reaches the objective 4 which thus produces a visible image of the deformation of the liquid film in the eyepiece.

In the embodiment according to FIG. 1 the light is reflected twice and in the embodiment according to FIG. 2 four times at the surface of the liquid film. In the first embodiment the sensitivity is theoretically improved by a factor of four and in the second embodiment by a factor of 16. Naturally this considerable increase in sensitivity must be paid for by a certain reduction in definition, since it is impossible, particularly in the course of four reflections to focus each beam four times exactly on the same spot of the surface of the liquid film. The theoretical sensitivity is reduced by the scattering of the light by the optical elements. It has nevertheless been found in practice that the first embodiment can provide at least an increase by a factor of two and the second embodiment an increase by at least a factor of four, while the power of resolution still remains satisfactory for the majority of purposes.

In the illustrated embodiments the surface 12 of the prism 7 facing the schlieren bar and slot system 2 is spherically concave. The curvature is so chosen that the center of curvature M lies at least approximately in the plane of the schlieren bar and slot system 2 but outside its field. This arrangement ensures that stray light does not degrade the image formed in the eyepiece.

What is claimed is:

1. Apparatus for making infrared light visible comprising a transparent prism having at least one plane face; a liquid film deposited on said plane face, the film being deformable by incident infrared radiation and the amount by which the film deforms being related to the intensity of the infrared radiation; an optical grating over said liquid film; a concave mirror; a schlieren-optical system including a bar and slot system and a source for projecting a beam of visible light; the concave mirror, the bar and slot system and the light source being positioned relative to each other and to the prism to cause the bar and slot system to be imaged on itself so that the light beam from said source is projected through said prism to be totally internally reflected at the surface of the liquid film adjacent said grating and then reflected by said concave mirror back through the prism to be again totally internally reflected at said adjacent surface and then imaged on said bar and slot system, the maximum linear diameter of the light beam in the plane of the bar and slot system being smaller than the product of the spacing of the lines in the optical grating, the refractive index of the material of the prism and the radius of curvature of the concave mirror divided by the greatest distance between the concave mirror and the surface of the liquid film.

2. Apparatus according to claim 1 in which the surfaces of the bars of the bar and slot system are mirrored and the light source is arranged to project said beam onto said mirrored surfaces so that the beam is then projected through said prism and back to the mirrored bars.

3. Apparatus according to claim 2 in which said concave mirror comprises a mirrored concave surface of said prism.

4. Apparatus according to claim 3 in which that surface of the prism through which said beam enters from said bar and slot system is concave having a center of curvature in the plane of but distant from said bar and slot system to prevent light scattered from the concave surface from being imaged on said bar and slot system.

5. Apparatus according to claim 2 including second and third concave mirrors positioned in the image path which images the bar and slot system upon itself, the second concave mirror being in the plane of the bar and slot system but displaced to one side thereof and the center of curvature of the first mentioned concave mirror falling between the bar and slot system and said second concave mirror so the reflected beam emergent from said prism is reflected by said second concave mirror onto the third concave mirror which reflects the beam back to the second concave mirror, through the prism back to the first mentioned concave mirror which reflects the beam back to the bar and slot system, the beam being totally internally reflected at said adjacent surface four times.

6. Apparatus according to claim 5 in which said concave mirror comprises a mirrored concave surface of said prism.

7. Apparatus according to claim 5 in which that surface of the prism through which said beam enters from said bar and slot system is concave having a center of curvature in the plane of but distant from said bar and slot system to prevent light scattered from the concave surface from being imaged on said bar and slot system.